US 6,670,810 B2

(12) United States Patent
Duncan et al.

(10) Patent No.: US 6,670,810 B2
(45) Date of Patent: Dec. 30, 2003

(54) SYSTEM AND METHOD FOR DISTRIBUTED MONITORING OF SURROUNDINGS USING TELEMETRY OF DATA FROM REMOTE SENSORS

(75) Inventors: Paul G. Duncan, Vienna, VA (US); Sean Michael Christian, Woodbridge, VA (US)

(73) Assignee: Airak, Inc., Manassas, VA (US)

( * ) Notice: Subject to any disclaimer, the term of this patent is extended or adjusted under 35 U.S.C. 154(b) by 0 days.

(21) Appl. No.: 09/841,164

(22) Filed: Apr. 25, 2001

(65) Prior Publication Data
US 2002/0043969 A1 Apr. 18, 2002

Related U.S. Application Data
(60) Provisional application No. 60/199,347, filed on Apr. 25, 2000, and provisional application No. 60/199,346, filed on Apr. 25, 2000.

(51) Int. Cl.[7] ............................................... G01R 33/02
(52) U.S. Cl. ..................... 324/244.1; 324/260; 359/280
(58) Field of Search ............................. 324/244.1, 250, 324/259, 260, 96, 110; 340/870.11, 870.17; 359/280, 281, 282, 283

(56) References Cited

U.S. PATENT DOCUMENTS

| | | | | |
|---|---|---|---|---|
| 4,614,945 A | | 9/1986 | Brunius et al. ........... 340/870.3 |
| 4,830,757 A | * | 5/1989 | Lynch et al. ................. 210/742 |
| 5,056,107 A | | 10/1991 | Johnson et al. ................. 375/1 |
| 5,239,575 A | | 8/1993 | White et al. ................. 379/107 |
| 5,448,230 A | * | 9/1995 | Schanker et al. ....... 340/870.03 |
| 5,473,322 A | | 12/1995 | Carney ................... 340/870.02 |
| 5,553,094 A | | 9/1996 | Johnson et al. ............. 375/200 |
| 5,617,084 A | * | 4/1997 | Sears .................... 340/870.02 |
| 5,687,093 A | | 11/1997 | Long et al. ................. 364/512 |
| 5,874,731 A | | 2/1999 | Swanson ..................... 250/214 |

\* cited by examiner

Primary Examiner—Jay Patidar
Assistant Examiner—Subhash A Zaveri
(74) Attorney, Agent, or Firm—Greenberg Traurig; Richard E. Kurtz, II; James E. Goepel

(57) ABSTRACT

A system and method for gathering and analyzing data captured from one or more remote sensing units positioned in the field. Remote sensing units preferably utilize optical sensors. Power to sensing unit components is preferably selectively controlled to reduce power consumption. Remote sensing units according to the invention can be used for a variety of purposes, including water quality or electrical power monitoring, and data from such sensing units is preferably transmitted to a secure host terminal via a communications link. The host terminal preferably formats, analyzes, and stores the data for customer review and retrieval. If alarm conditions exist that require immediate customer notification, such notification can be sent to a customer via one or more telecommunications means. Through the use of the present invention, businesses can shift from a reactive to a proactive mode of monitoring and operation.

16 Claims, 3 Drawing Sheets

SYSTEM AND METHOD FOR DISTRIBUTED MONITORING OF SURROUNDINGS USING TELEMETRY OF DATA FROM REMOTE SENSORS

This application claims the benefit of U.S. Provisional Patent Application Serial No. 60/199,346, filed Apr. 25, 2000, the entire disclosure of which is incorporated herein by reference. This application is related to U.S. Provisional Patent Application Serial No. 60/199,347, filed Apr. 25, 2000, and to U.S. patent application Ser. No. 09/421,399, filed Oct. 21, 1999, the entire disclosures of which are incorporated herein by reference.

This application includes material which is subject to copyright protection. The copyright owner has no ojection to the facsimle reproduction by anyone of the patent disclosure, as it appears in the Patent and Trademark Office files or records, but otherwise reserves all copyright rights whatsoever.

BACKGROUND OF THE INVENTION

1. Field of the Invention

The invention relates in general to distributed monitoring of remote sensors, and in particular to novel systems which are useful for remote monitoring of chemical properties or electric current.

2. Related Art

Over the last three decades the United States has spent billions of dollars trying to monitor and clean up contaminated ground water and soils as a result of a period in which the industrial expansion of our Nation outpaced our knowledge of safe chemical disposal. Despite large sums of financial investment to protect and recover natural resources, scientists continue to struggle to accurately monitor ground water and detect contaminants, or quantify the effect of contaminants on the ecosystem as a whole. This struggle is due to two primary reasons: 1) there is a lack of advanced, field deployable, environmental sensory systems capable of continuous, long-term monitoring of physical, chemical, and biological measurands, and 2) there are major problems associated with biofouling of the sensors due to nutrient overloading and algae growth.

The presence of chemicals and complex molecules determines the health of a water source in relation to the ecosystem as a whole, and is typically classified into two groups: primary and secondary contaminants. The former group, which includes heavy metals, radionucliotides, and dioxins, is often characterized as those contaminants that are stable in nature and resist breakdown due to sunlight or temperature, or do not dissolve easily into a water system. These primary contaminants often lead to localized hot spots within an ecosystem, resulting in complete devastation of the normal localized aquatic balance in addition to becoming a point source for continuous contamination for decades to come. By contrast, the latter group is known as the effect group, and is characterized by the overall change in traditional water quality monitoring parameters which include dissolved oxygen (DO), pH, dissolved solids, nitrate-nitrite nitrogen (NNN), and total phosphorous (TP).

Historically, monitoring of contaminants or their effects has been done through discrete sampling of contaminated sites at random intervals. The samples are then processed off-line through wet-chemistry methods, often several days or weeks after the sample was gathered. The most significant impact of this methodology is that notification of events affecting the change in water quality parameters do not occur until after the change has caused some form of catastrophic event, such as illness or death in humans or an entire stretch of river dying due to total consumption of dissolved oxygen. Additionally, discrete random sampling also causes uncertainty; with no temporal correlation of the data, it is often difficult to determine what was a cause and what was an effect.

Sensor technology for measuring contaminants or their effects on the ecosystem continues to improve. Optical-based sensors are especially promising due to their inherent advantages with respect to sensitivity, large dynamic range, immunity to electromagnetic interference, and lightweight profiles. For example, optical techniques demonstrating heavy metals detection and classification have been published as have techniques for detecting biological agents, $H_2S$, and the aforementioned water quality parameters NNN, $CO_2$, DO, and pH.

Unfortunately, sensor technology for detection is not the total solution. Real-world problems such as biofouling, environmental extremes, and issues involving data, such as transport mechanisms, storage, and analysis, need to be addressed in parallel with improvements in sensor technology to affect significant advances in monitoring the world's natural resources.

As with the field of environmental monitoring discussed above, monitoring technologies in the field of electrical power generation, distribution, and transmission have also been subjected to technical limitations and inefficiencies. Having timely knowledge of past and present static and dynamic states in power generation facilities and distribution and transmission grids is critical in decision making, power scheduling, billing, model studies, planning protection, and maintenance. To date, the task of collecting data on a distributed power system has been relegated to a collection of disassociated electronic subsystems scattered throughout the grid. All are ordinarily standalone designs, most having no high-throughput networking provisions and, at best, only the most recent designs employ any digital capability (mass storage, rule-based triggering, adaptive process tailoring, etc.). Most previously installed measurement systems were designed specifically for a particular task and the concept of integrating all measurement components into a single body was not possible for a host of varied reasons. It is not uncommon to find decision-makers located in the control room at a major utility with three or more computer terminals on their desks with virtually no way to pass information between them.

Within the last few years, the most important pressure upon electric-power utilities has been the result of deregulation and the subsequent economic competition that it has promoted. In order to remain competitive and profitable, providers of electric power have been forced to review all aspects of their operations and seek methods that improve efficiency. Of the numerous areas identified where cost savings could be implemented, improving power transfer efficiency, real-time control of power networks, and detection and prevention of potential line fault conditions through online monitoring all rank in the top target areas for focus and development.

A major impediment to improved power transfer efficiency is existing transducer technology. Virtually unchanged over the last several decades, conventional current/potential transformers are characterized by their bulkiness, expense, geometry, large volumes of electrical insulation required when used on high-voltage lines, and potential for catastrophic failure. With respect to real-time control of power networks and the detection/prevention of line fault conditions, most types of conventional transformers exhibit significant bandwidth limitations, restricting their usefulness in the monitoring of harmonics and subsequent determination of power quality or the exact timing of line fault events.

A 1995 article by the Electrical Power Research Institute (EPRI) indicates that a 1% increase in efficiency due to improved sensors and instrumentation in coal-fired generator plants translates to a savings of over $300 million per year. Moreover, a 1% increase in capacity utilization throughout the utilities due to advanced instrumentation would result in over $3 billion in saving per year for the industry.

On Jul. 2, 1996, a short-circuit on a 345-kV line in Wyoming started a chain of events leading to the breakup and complete islanding of the western North American power system. Loads were very high due to local demand in southern Idaho and Utah because of temperatures around 100° F. Simultaneously, power exports from this region to California were high, causing many of the distribution lines to operate near capacity. A flashover to a tree at 2:24 p.m. initiated a chain of events, and when coupled with the failure of equipment and harmonic instability within the power distribution network, numerous protective devices kicked in to isolate a 5-state area. The impact was a total loss of power for over 15 million commercial and residential customers and a total estimated revenue loss approaching $2,000,000,000. Furthermore, post analysis of the data that does exist from this outage has indicated that if a real-time, bi-directional communications system had been in place, operators or computers would have had approximately 110 seconds to prevent collapse of the entire grid system, potentially saving the utilities and their customers hundreds of millions of dollars.

OBJECTS AND SUMMARY OF THE INVENTION

It is therefore an object of the invention to provide an improved system and method for remote monitoring.

It is a further object of the invention to provide a remote monitoring system and method which provides the capability of delivering sensor data to monitoring facilities in a timely manner, whereby catastrophic environmental or power delivery events can be forseen and averted or minimized.

It is a further object of the invention to provide a remote monitoring system and method which can be practiced in a less costly and less labor-intensive manner than those of the prior art.

In a preferred embodiment, the invention provides a system for gathering, transmitting, and storing data captured from remote monitoring sites positioned in the field, with specific applicability to distributed chemical sensing and reporting, as well as distributed power monitoring and reporting. Transducers monitoring water quality parameters or electrical power parameters have their data transmitted to the Internet or Intranet via a communications link. From here, the data is relayed to secure servers where it is formatted, analyzed, and stored for later retrieval by a customer. If alarm conditions exist that require immediate customer notification, notifications are sent via one or more telecommunications means, including pager, cellular telephone, or email. With respect to the distributed chemical sensing embodiments, the invention preferably utilizes fiber optic chemical sensors that addresses the problem of bio-fouling. Using anti-fouling measures, the invention can provide continuous, long-term waterway monitoring. With respect to distributed power monitoring and reporting, the invention preferably utilizes a fiber optic optical current transducer system for the measurement of magnetic fields in electric power and power electronic applications. The transducer is based upon rare-earth iron garnet (REIG) crystals that exhibit the Faraday effect when placed in a magnetic field. This transducer is extremely lightweight, making retrofitting of existing distributed power monitoring grids extremely cost effective. In both cases, the respective sensor technologies are coupled with wireless telecommunications and network infrastructures to provide businesses with the ability to shift from a reactive to a proactive mode of operation, enabling them to become more efficient in their business operations.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Figure 1:
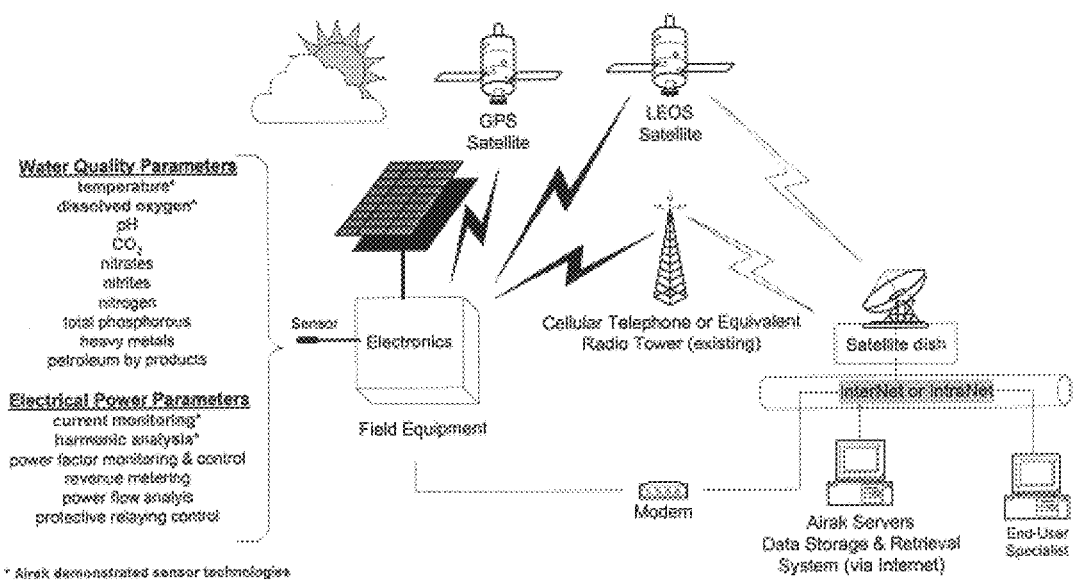
FIG. 1 is a block diagram illustrating the overall operation of the hardware and software of the system of the invention in accordance with a preferred embodiment.

FIG. 1 is a block diagram illustrating overall hardware and software system operation of the present invention in accordance with a preferred embodiment. Transducers that monitor water quality parameters or electrical power parameters have their data transmitted to the Internet or Intranet via a communications link. From here, the data is relayed to secure servers, where it is formatted, analyzed, and stored for later retrieval by a customer. If alarm conditions exist that require immediate customer notification, such notifications are sent to a customer via one or more telecommunications means, including pager, cellular telephone, or email. Other known means for providing such notification over a telecommunications network are possible without departing from the spirit and scope of the invention.

The following sections further describe detail and options surrounding the preferred system implementation.

Field Implementation—Hardware Configuration

A preferred remote field unit (RFU) is considered a ground-based satellite and, as such, is completely autonomous. An RFU can contain units performing various functions, including:

A sensor function,

A signal processing function,

A control function,

A power function,

A tamper function,

A global positioning system (GPS) function, and

A two-way telemetry function.

Figure 2:
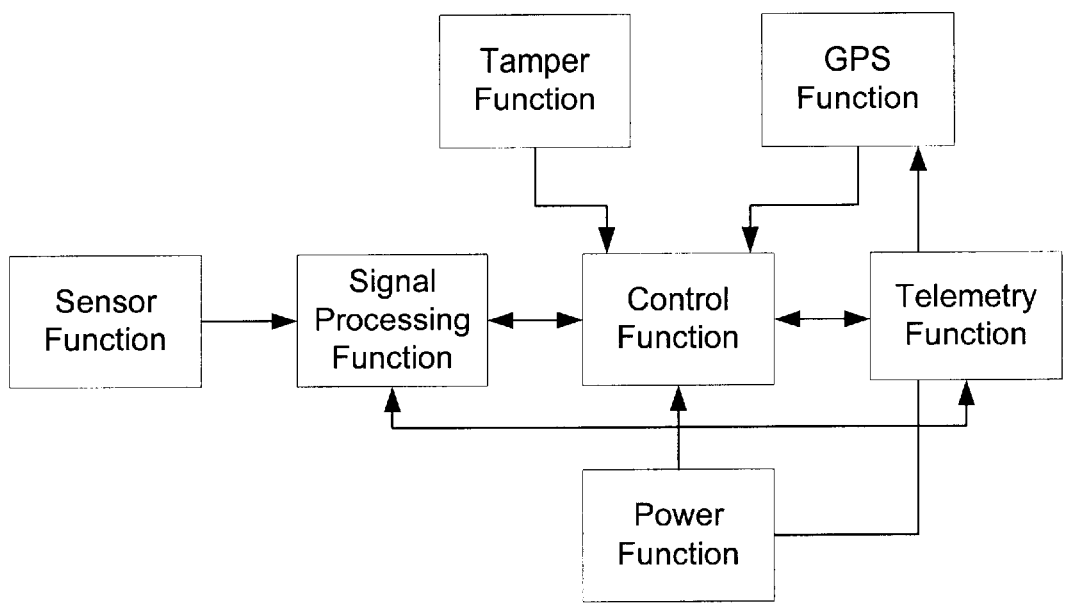
FIG. 2 is a block diagram illustrating the basic functions of the remote field unit of the invention.

FIG. 2 shows the relationship of the above functions; an overview of their operation follows.

Sensor Function

The sensor function is a physical interface between a quantity being measured and an RFU. Possible sensor inputs are listed in the lower left corner of FIG. 1. This list is not considered exhaustive; other possible sensor input will be apparent to those skilled in the art. Multiple sensors can form the sensor function.

Signal Processing Function

A signal processing function preferably contains three inputs or input sets: (1) a set of inputs from a sensor function, (2) a set of inputs from a control function, and (3) a set of inputs from a power function. Additionally, a signal processing block can contain a set of outputs to a control function. The primary task of a signal processing block is to convert physical signal(s) from a sensor function to numerical representations of a measured signal. The signal processing function is under program control from the control function, from where it derives all algorithmic manipulations of the sensor signal(s), timing information, and self-diagnostic instructions. The signal processing function derives its power from the power function.

The output of this block consists of formatted sensor data as well as control, indicator, and diagnostic information.

Contained within this function are all electronics and optics necessary to convert the signals from the sensor function to their representative values. Additionally, inputs from third-party devices are included in this function.

Control Function

The control function preferably operates under program control and is a state machine. A preferred control block embodiment can receive five inputs: (1) a set of inputs comprised of formatted sensor data as well as control, indicator, and diagnostic information from the signal processing function, (2) a set of inputs comprised of indicator information from tamper alarms, (3) a set of inputs comprised of control data as well as control, indicator, and diagnostic information from the telemetry function, (4) a set of inputs from the global positioning system, and (5) a set of inputs from the power function.

A preferred control block embodiment can also receive two inputs: (1) a set of outputs to the signal processing function and (2) a set of outputs to the telemetry function. The set of outputs to the signal processing function are used to acknowledge data sent from the signal processing function as well as to control the mode of operation of the signal processing function. The set of outputs to the telemetry function is used to transfer sensor data to the telemetry function as well as control information.

The control function is the "heart" of the RFU. Depending upon the mode of operation, the control function will orchestrate all inter-processor communications, diagnostic functions, as well as data formatting, storage, and relaying. Additionally, the control function will perform periodic "state-of-health" diagnostics of all system parameters to ensure proper operation. Finally, the control function formats system data into a desired data communications protocol or protocols, and translates incoming formats into system command sequences.

Telemetry Function

The telemetry function serves the purpose of transmitting data from the RFU as well as receiving data intended for the RFU. Telemetry can be implemented through a variety of hardware implementations, depending upon the physical RFU geographic location or anticipated RFU functionality. Such hardware implementations can include, but are not limited to:

(1) Wireline interface,
(2) Wireless point-to-point radio-frequency (PPRF) interface,
(3) Wireless cellular interface, and
(4) Wireless RF satellite interface.

Wireline interfaces are preferably implemented whenever there is a direct connection available to plain old telephone service, known in the telecom industry as POTS. This would allow the RFU to directly dial into the Internet/Intranet via a local service provider (ISP), and as of this writing, is the most cost-effective data transfer methodology.

Wireless PPRF interfaces are preferably implemented whenever POTS is not available. This configuration increases overall initial system costs due to the need for multiple transceivers, but over time becomes the next cost-effective data transfer methodology. An RFU would connect via direct radio link to a corresponding base unit, the latter directly connected to POTS.

An alternative PPRF implementation can allow an RFU to transmit data from other RFUs. In this embodiment, an RFU which is incapable of directly transmitting data to a base unit can transmit data to another RFU, which can in turn transmit received data, as well as data collected at the RFU, to another RFU or directly to a base unit, if such a base unit is available. An RFU receiving data from another RFU may store received data, or may open communications with another RFU or base station and retransmit such data as it is received.

Wireless cellular interfaces are preferably implemented when POTS is not available, PPRF is not desired or practical, and cellular coverage is assured. As with a POTS implementation, an RFU can directly dial into the Internet/ Intranet via an ISP. This is the next mostly costly alternative due to the monthly charges of cellular airtime.

Finally, wireless RF satellite interfaces can be used any time the previous telemetry options are not available. This option represents the greatest cost to the customer due to the costs of satellite bandwidth usage.

Tamper Function

The tamper function is incorporated into the RFU and provides alarm notification that the system is being tampered with or that diagnostics have failed. This is an output-only function that provides its status word to the control function.

GPS Function

The GPS function serves two purposes: (1) provide a very precise (<10e-5 second resolution) time stamp to the data, and (2), if the RFU is installed on a mobile platform, provide extremely accurate global positioning information for incorporation into the status word. The former is used to specifically time-correlate multiple RFU data sets at the network operations center, with the latter can be used by RFUs that are mobile in design (such as autonomous underwater vehicles).

Power Function

The power system can be driven from standard electrical or battery power where delivery and maintenance of such power is economically feasible. Alternatively, power can be generated at or near an RFU through a variety of alternative energy means, including, but not limited to, solar power, hydrodynamic power, or windmills. The latter represents the most probable solution for the majority of the RFUs.

Figure 3:
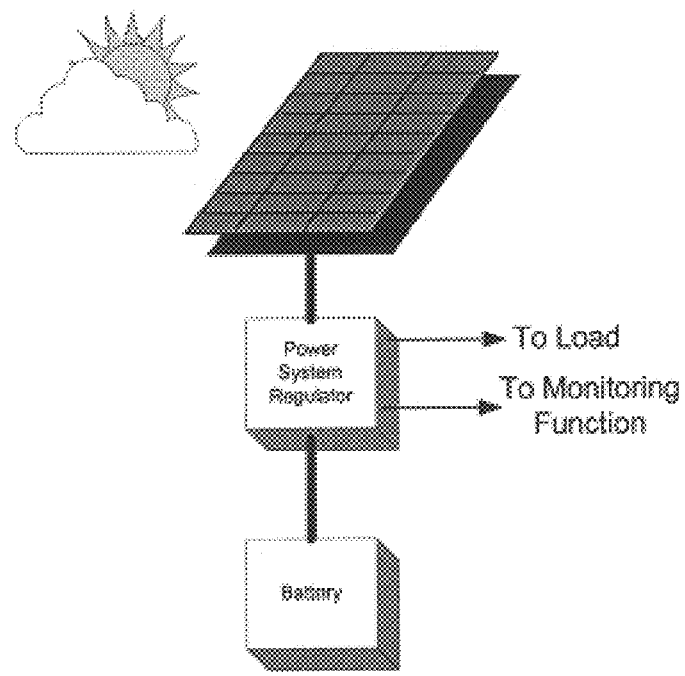
FIG. 3 is a functional block diagram illustrating the solar array power subsystem of the invention.

FIG. 3 illustrates a preferred power system embodiment which utilizes solar power. Such a power system can consist of a solar array panel, a power system regulator, and a battery. The function of each of the blocks is straightforward and is explained below.

Solar Array. The solar array function converts light from the sun into useable energy. Array output can typically fluctuate from 0 (darkness) to nearly 22 vdc in direct sunlight, no load.

Power System Regulator (PSR). The PSR's primary goal is to ensure that the load bus remains at constant voltage, independent of the input from the solar array or battery. To accomplish this, the PSR is comprised of both a buck and boost regulator.

The boost regulator is activated any time the battery voltage drops below the bus regulation voltage, typically 12 vdc. At the expense of a greater drain in power on the battery, a load bus can be maintained at or near bus regulation voltage.

The buck regulator performs the opposite function—any time the bus voltage exceeds the normal setpoint value the buck regulator will reduce the amount of voltage on the bus by either 1) shunting energy through large MOSFETs connected to a heatsink, or 2) delivering the excess energy to the battery charger circuit so that the battery reserves are maintained.

Battery. This is typically a gelled electrolyte battery that has the advantage of not stratifying like conventional lead-acid types. The use of "environmentally friendly" batteries that are non-spillable and sealed are preferably used so that transport to the installation site will require no additional safety precautions.

A PSR monitoring function can provide digital and analog outputs to indicate PSR status. Typically, most PSRs use binary bits to indicate current operational mode (boost, charging, floating, and the like) and any abnormal conditions. Analog outputs are scaled voltages of the amount of voltage being produced by the array, the load on the battery (from the load bus), and the charging current to the battery. This information may be integrated into the status word reported from the remote site.

Field Implementation—Modes of Operation

Figure 4:
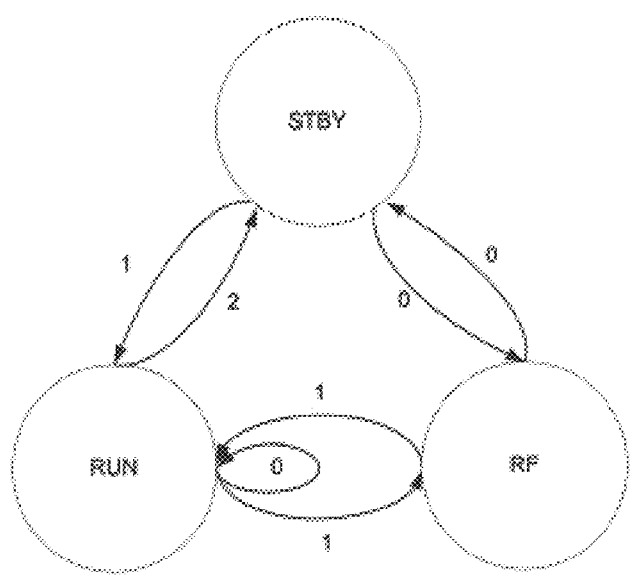
FIG. 4 is a state diagram illustrating the modes of operation for the RFU of the invention.

The RFU is preferably a state machine operating under program control. Three principle modes of operation are preferably provided: standby (STBY), runtime (RUN), and transmission/reception (RF). FIG. 4 is a state diagram illustrating preferred RFU operation modes and their interoperation. Each mode is described below.

STBY State

The duty cycle of data collection can span from as little as one sample per day to nearly continuous sampling. For those situations or applications where continuous sampling is not required or when RFU communication is not necessary, power-consuming devices such as sensors, a controller, and a transceiver, can be taken offline to minimize power system battery drain, thereby extending battery lifetime.

Processor functions are under program control. Timing is provided by an onboard watchdog timer that also provides a master timestamp for all data gathered. While in standby mode, a processor can run "scrub" operations, including diagnostics and peripheral scans of the tamper switches.

In the event diagnostic or tamper switches indicate an abnormality, the processor will power the system and attempt to immediately transmit an alarm notification. After alarm transmission and acknowledgement reception, the system will return to STBY mode.

RUN State

The RUN state is the data collection mode, and can be attained from the RUN state, RF state or the STBY state. At predetermined times under program control, the system can initiate an environmental data sampling cycle. If in the STBY state, power will be applied to the data collection circuitry. After a warm-up requirement has been met data will be gathered from the system. After processing, the data will be stored onboard in memory until emptied by a transition from the RUN to RF states. If the program indicates a return to the STBY state the power to the data collection circuitry will be removed until the next acquisition period.

The RUN state can also be entered from the RF state. After data transfer, if the program indicates that continuous monitoring is required, the system will return to data collection mode and will log data as previously described.

Finally, RUN state is reentrant. If the program determines that continuous data collection is required, but it is not time to transmit, then the sequence will loop until a transition to the RF state occurs.

RF State

RF state can be entered from either the STBY state or from the RUN state, as in the case where data must be offloaded. There are two conditions that may cause the RF state to be entered from STBY state: alarm and receive. If an alarm is generated, power will be applied to the transceiver and data will be formatted and sent to the transceiver. After reception of the acknowledgement, the system will transition back to the STBY state, deenergizing the transceiver.

The remote system may also be configured to receive commands while still conserving battery life. This is accomplished by the setting processor's watchdog timer to an appropriate interval. Each time the watchdog timer "wakes up" the processor, it turns on the receiver and listens for a predetermined length of time. If there is no information "on the air", the receiver is turned off and the processor returns to the low power STBY state. If there is information, the information is received, passed to the processor, and the appropriate action taken. System designers can extend the life of the battery by increasing the time between receive intervals at the expense of control delay. The interval itself may be modified. This will allow the system to be more interactive when necessary.

If entry to the RF state occurred from the RUN state, the system will transmit the data stream and upon receipt of the acknowledgement, will return to the RUN state to collect data.

In an alternative embodiment, an RFU can alternate between RUN and STBY states independent of data transmission needs. Data collected by an RFU can be stored in a first in, first out (FIFO) queue; database; or other data storage system. Such data can then be read as necessary by a data transmission system. Data transmission can begin at the occurrence of one or more events, such as elapsing of a specific time interval or collection of a requisite number of data samples. Transmitted data may be removed from a data storage system, thereby reducing RFU data storage requirements. As with the previously described embodiment, a watchdog timer or other device can trigger periodic monitoring for inbound data.

Field Implementation—Deployment

The RFU can be fixed or mobile in configuration. Examples of fixed unit locations for water quality monitoring are effluent monitoring points, lakes, streams, rivers, aquifers, etc. Examples of fixed unit locations for the power monitoring industry are at tie points between generation and transmission subsystems, as well as between transmission and distribution subsystems.

Mobile applications for RFUs are envisioned using remote, autonomous underwater vehicles to sample the water column. This system could be the basis of a worldwide ocean or river observing system and would provide tremendous information concerning the changing ecosystems surrounding our waterways.

Telecommunications Considerations

Locations for monitoring sites will vary widely. For this reason, there is no single solution that is appropriate for all locations. Two factors must be considered with designing the communication link between the remote system and the host: Total Life Cycle Cost and availability. To achieve an optimum communication link, the link that meets the availability criteria at the lowest Total Life Cycle cost will be selected.

Communications link options will include, but are not limited to: land telephone lines (POTS), wireless land mobile, unlicensed Part 15 systems, AMPS Cellular (including CDPD and Cellemetry), RAM Mobile Data, ARDIS, and satellite systems (PanAm, Teleos, Orbcomm, Inmarsat-C, Argos, Qualcomm, Hughes, others) as available. The selection procedure should take into consideration the location of the remote site (terrain and coverage from communications providers) as well as the Total Life Cycle Cost of the system. Mixed systems may also be provided. These may use a combination of different communications systems to make a single link. For example, an inexpensive Part 15 device to transmit from a location with no phone line to a location with phone service (potentially saving thousands of dollars in special charges to run the phone line to the remote site).

Host Implementation

A single T1 or other high speed data communications line may provide bandwidth for a plurality of remote units. The exact number of such remote units supported by such a data communications line will depend on RFU sampling frequency and data size, but it is anticipated that a T1 line will easily support as many as 100 remote units.

Data received through such a data communications line may pass through a firewall computer to dedicated servers. Such servers can be built upon a SCSI backbone with RAID redundancy, and can both store incoming data and service user requests. To ensure maximum reliability and minimum download time for customers, multiple "redundant" connections to high-speed data networks may also be maintained. Further reliability can be achieved by utilizing a router and/or switch solution that incorporates advanced BGP4 routing technology or other similar technologies. Such a router configuration can allow a system operator to load balance bandwidth through multiple circuits. Such load balancing allows the routers to automatically compensate for any outages by using alternate circuits. The architecture outlined above provides a high availability, scalable data storage, analysis, and presentation platform capable of storing data from a large number of RFU's, storing such data for an indefinite period of time, and providing users with readily accessible data analysis and data presentation capabilities.

Customer Interaction

The customer is preferably provided with all RFU data through a standard Internet or Intranet interface, such as, Microsoft's Internet Explorer or Netscape's Communicator browsers running on personal computers. Other forms of visual access may be provided via web-enabled telephones, personal data organizers and assistants, netbooks, and the like. Voice-access may be provided through standard telephones, cellular telephones, and third-part service agencies.

Software

The software preferably resides on the host, and may be written in the Java and XML programming languages. This removes most compatibility issues with individual personal computer or other web-enabled platforms, and allows the system to be used by the largest base of customers and interface platforms. Content may be "pushed" from the host to the customer's browser on an as-required basis.

Data Analysis

The form of data analysis will be determined by the customer using various methods of selection, including pull-down menus, pre-loaded scripts, etc. The user preferably has the option to load specific algorithm packages onto their local machine or use the host server to perform all analysis. Furthermore, time histories, geographical mapping, and trend analysis are some of the many options available to the customer.

Database Generation

RFU data can be time stamped as well as positional stamped (mobile RFUs only). This enables the development of tremendous data sets on the performance of networks in a manner that has never been attempted. In the case of environmental data, these data sets can be correlated with space-based imagery to provide a better picture of developments on the globe. In the case of power system monitoring, disturbance propagation can be tracked and analyzed in a fashion that, before implementation of the present invention, has never been possible.

RFU/Customer Data Exchange

Two forms of data exchange are processed by the system: (1) data that is initiated from the customer, such as alarm setpoints, request for diagnostics, current position, and request for immediate sample, and (2) standard reporting data from the RPU. The customer has the ability to set alarm setpoints and notification strategies (pager, telephone, email, etc.) in the event that the RFU data falls outside acceptable limits.

Distributed Chemical Sensing

A distributed chemical sensing embodiment of the present invention preferably utilizes a non-mechanical, non-toxic (i.e. non-metal oxide) methodology for protecting optical based sensors from biofouling in many environments, including freshwater, saltwater, wastewater, etc. The antibiofouling methods of the invention provide remote sensors with the cabability of long-term deployment in aquatic environments without user intervention or mechanical action.

The preferred anti-fouling means comprises an anti-fouling coating on the optical sensor element. Requiring significantly less maintenance than conventional technologies, these coatings enable the sensors to remain in the field for extended periods of time. This in turn substantially reduces the high maintenance requirements associated with conventional sensor technologies, thus enabling distributed sensing infrastructure development and deployment. Such coatings are taught in more detail in the U.S. Provisional Patent Application entitled "Anti-biofouling Method and Apparatus for Optical Sensors," filed Apr. 24, 2000, by inventors Paul G. Duncan et. al, the entire disclosure of which is incorporated herein by reference.

Distributed Power Monitoring and Reporting

Embodiments of the invention which are designed for distributed monitoring of electrical power generation and transmission preferably use an optical magnetic field sensor element such as that disclosed in co-pending U.S. patent application Ser. No. 09/421,399 entitled "Methods and Apparatus for Optically Measuring Polarization Rotation of Optical Wavefronts Using Rare Earth Iron Garnets," filed Oct. 21, 1999, the entire disclosure of which is incorporated herein by reference. The extremely high bandwidth (>700 MHz) of such sensor elements is only limited by the speed of the signal processing electronics to convert the optical signal to a control or indicator value. One estimate of the bandwidth needs of the power industry per sensor element is five times the 51$^{st}$ harmonic of the line frequency, which is approximately 15 kHz, or 45 times lower than the demonstrated 700 MHz limit. For disturbance monitoring, where events occur in microsecond periods, the above-described optical sensors will have no trouble seeing the fault.

The following are other features of such sensors which are not available with conventional current transducers, and which provide significant advantages in the present application with respect to deployment and use of large numbers of wide-area sensors and their support systems:

| Features | Benefits |
| --- | --- |
| Low cost sensor | Immediate savings in investment of transducer technology, allowing greater numbers to be deployed. |
| Sensor and interconnect is fiber-optic based | Immune to electro-magnetic interference Intrinsically safe and isolated from high voltages, hence do not contain explosive insulating oils Lightweight Support equipment can be positioned great distances from the sensing location |
| Sensor can measure high frequency waveforms | Enables waveform analysis to improve efficiency and reduce delivery costs Allows utilities to address power quality issues that saves them and their customers money |
| Sensor does not saturate | Removes potential for catastrophic explosions Provides continuous data independent of load conditions |

While the invention has been particularly shown and described with reference to a preferred embodiment thereof, it will be understood by those skilled in the art that various changes in form and details may be made therein without departing from the spirit and scope of the invention.

We claim:

1. A remote sensing unit, comprising:
   at least one optical sensor, for measuring various aspects of the environmental in parameters in proximity to a remote sensing unit;
   at least one signal processor, for processing measurements from said at least one sensor;
   a two-way telemetry function, for sending data to and receiving data from a host terminal;
   a tamper detection system for determining when said remote sensing unit has been opened;
   at least one controller, for storing results from said at least one signal processor, controlling power availability to selected devices associated with said remote sensing unit, and for processing data from said host terminal; and,
   at least one power supply, for distributing controlled power to selected devices associated with said remote sensing unit.

2. The remote sensing unit of claim 1, in which said optical sensor can detect electrical current flow.

3. The remote sensing unit of claim 1, in which said optical sensor can detect the chemical composition of an environment surrounding said sensors.

4. The remote sensing unit of claim 1, in which said at least one sensor includes a biocide to retard or eliminate biofouling.

5. The remote sensing unit of claim 1, in which said at least one controller includes a microprocessor.

6. The remote sensing unit of claim 1, in which said at least one controller can control power distribution from said one or more power supplies to other remote sensing unit components.

7. The remote sensing unit of claim 1, in which said at least one power supply receives traditional electrical power.

8. The remote sensing unit of claim 1, in which said at least one power supply receives power from an alternative energy source.

9. The remote sensing unit of claim 1, in which said two-way telemetry function includes one or more cellular telephone interfaces.

10. The remote sensing unit of claim 1, in which said two-way telemetry function is comprised of plain old telephone service.

11. The remote sensing unit of claim 1, in which said two-way telemetry function is comprised of a wireless, point to point radio frequency interface.

12. The remote sensing unit of claim 1, in which said two-way telemetry function is comprised of a wireless satellite interface.

13. The remote sensing unit of claim 1, further comprising position determination device.

14. The remote sensing unit of claim 13, in which said position determination device is a Global Positioning System receiver.

15. A remote sensing method, comprising the steps of:
   controlling power available to selected remote sensing unit components;
   using at least one optical sensor to measure at least one aspect of the environmental parameters in proximity to said remote sensing unit;
   processing and storing said at least one measured aspect as data; and, monitoring said remote sensing unit for evidence of tempering function;
   using a two way telemetry means to transmit and receive said data from a host terminal.

16. The remote sensing method of claim 15, further comprising the step of defining appropriate intervals during which said controlled power is available to said remote sensing unit components based on control information received from said host terminal.

* * * * *